Figure 1:
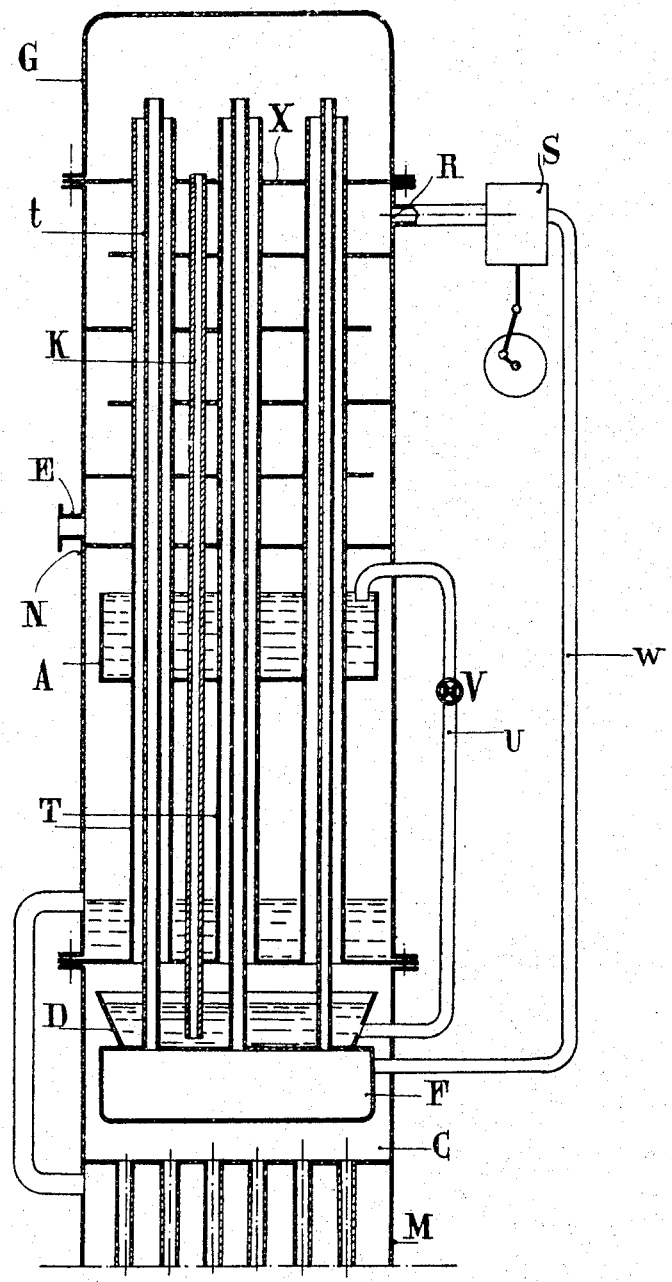

Sept. 20, 1932.  A. ETIENNE  1,878,123
PROCESS FOR THE SEPARATION OF THE CONSTITUENTS
OF GASEOUS MIXTURES BY LIQUEFACTION
Filed Oct. 30, 1926  3 Sheets-Sheet 1

INVENTOR:
Alfred Etienne
BY
ATTORNEY

Patented Sept. 20, 1932

1,878,123

UNITED STATES PATENT OFFICE

ALFRED ETIENNE, OF MONTEREAU, FRANCE, ASSIGNOR TO LA SOCIETE L'AIR LIQUIDE, SOCIETE ANONYME POUR L'ETUDE ET L'EXPLOITATION DES PROCÉDÉS GEORGES CLAUDE, OF PARIS, FRANCE

PROCESS FOR THE SEPARATION OF THE CONSTITUENTS OF GASEOUS MIXTURES BY LIQUEFACTION

Application filed October 30, 1926, Serial No. 145,232, and in France December 24, 1925.

This invention relates to processes for the separation of the constituents of gaseous mixtures by liquefaction and particularly to processes for the extraction of hydrogen by liquefaction of the other gases accompanying it in the gaseous mixture to be treated; in what follows, this particular case alone will be considered by way of example so as to facilitate the explanation and description of the process.

As has been described in a number of prior patents assigned to Société L'Air Liquide and relating to the treatment of hydrogen containing gases by partial liquefaction, the compressed hydrogen issues at the end of a system of tubes which are subjected to progressively lower temperatures and wherein the condensation is effected under conditions of backward return of the less volatile products; the hydrogen issuing from the said system of tubes is delivered directly, or after being reheated to some extent, to an expansion motor in which it is expanded, whereafter the cooled expanded gas is recirculated through a compartment in which the end part of the tube system is located and which is thus cooled to the lowest temperature produced in the liquefaction apparatus. For the different cases which occur in practice there have been described various modified processes based upon this principle, and the present invention likewise has for its object improvements in this method of operation.

According to the present invention, instead of expanding the hydrogen either directly or after reheating it in an apparatus distinct from the separation column, such as a liquefier for example, the compressed hydrogen prior to its expansion is reheated in the separation column itself in counter current and in indirect contact with the gases during the course of the separation process. In the part of the tube system round which the expanded hydrogen circulates, the calorific capacity of this expanded hydrogen is less than that of the gaseous mixture circulating in its indirect contact by an amount corresponding to the quantity of the liquid which is formed in this compartment and flows back into the lower compartments, so that by the present method the cooling effect of the expanded hydrogen is thus increased by the effect of the compressed hydrogen; the calorific capacity of the combined cooling media, instead of being less than that of the ascending gaseous mixture, now exceeds it owing to the use made of the calorific capacity of the compressed hydrogen. The result is that the gaseous mixture subjected to the cooling action can thus attain a lower temperature which advantageously affects the purity of the hydrogen. In addition to this the heating of the compressed hydrogen takes place with a difference of temperature as low as possible between the two currents of compressed gases, and at the same time, owing to the reheating of the compressed hydrogen, its expansion with the production of external work can be effected under better conditions, and heat losses that otherwise result from the use of an external liquefier are avoided.

In order that the said invention may be clearly understood and readily carried into effect, the same will now be more fully described with reference to the accompanying drawings, which illustrate diagrammatically and by way of example, three forms of apparatus for carrying out the present process.

Figure 2:
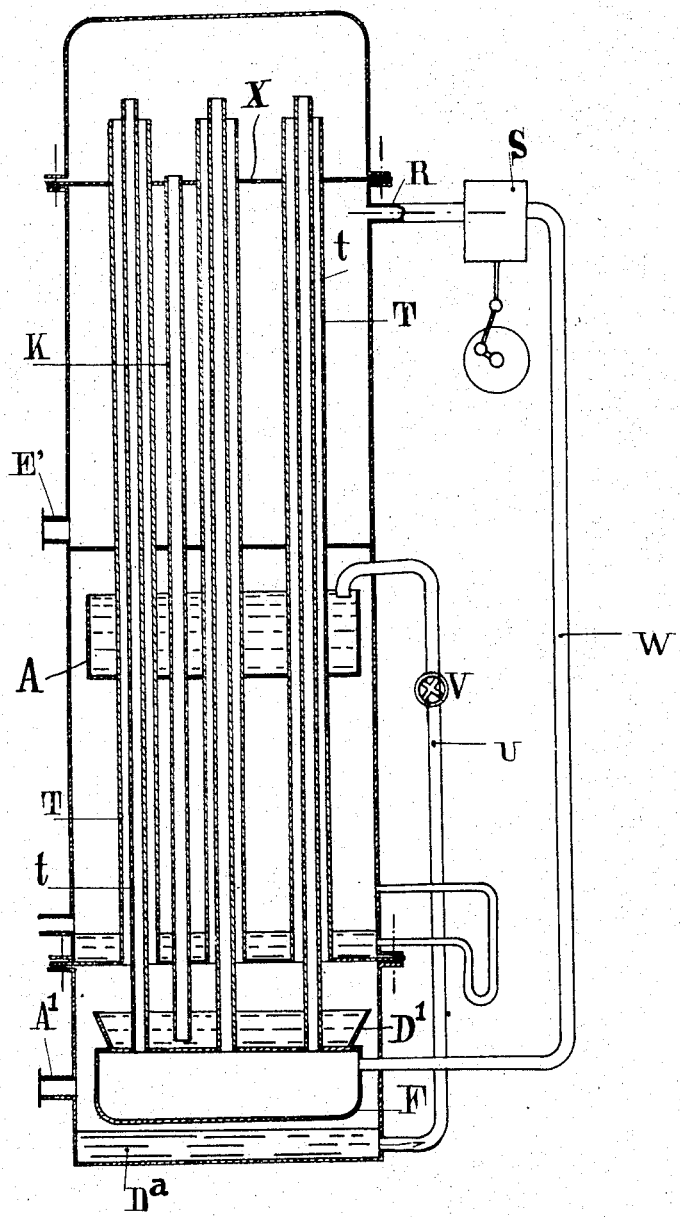
Figure 3:
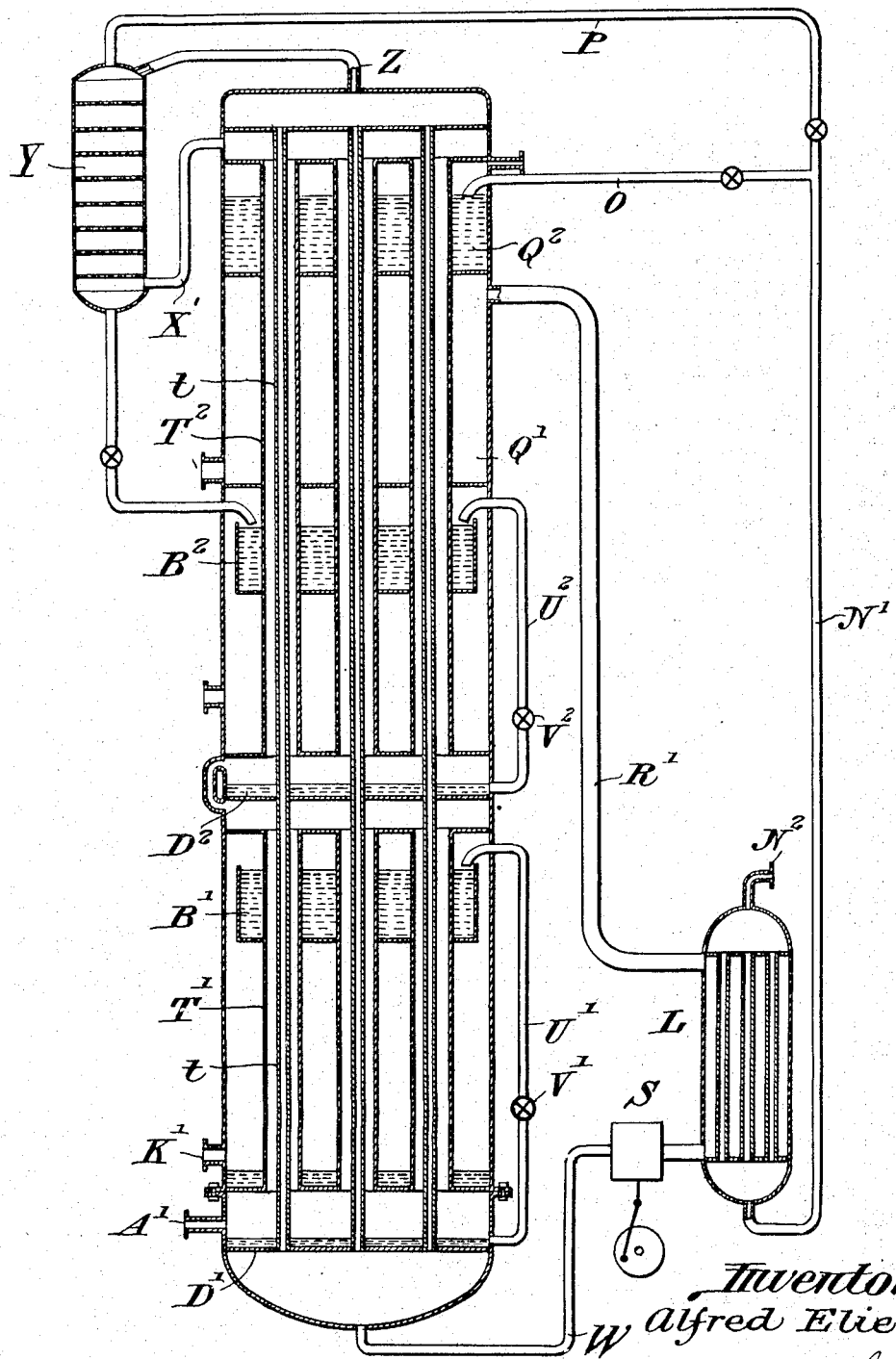

In said drawings, Figure 1 represents an apparatus for treating coke oven gas, according to the invention; Fig. 2, an apparatus for treating water gas or like gas; and Fig. 3 represents a modification comprising an auxiliary nitrogen liquefier and a column for rectifying the hydrogen under pressure by the liquid hydrogen.

Referring to the apparatus shown in Figure 1, which is suitable for the treatment of a gaseous mixture such as coke oven gas, M is the lower part of a separating column in which the main condensation that takes place is that of methane and similar gases. The ascending gases then pass into the intermediate part C of the column and thence into the tubes T of the upper part N of the column in which the condensation of their condensable constituents continues to take place; the condensates produced in the tubes T are collected in a receptacle D in a liquid state, whence they pass up through a pipe or tube U having a controlling valve V and are discharged into the receiver A from which the liquid flows down round the tubes T.

The condensation in the tubes T is effected in the lower part of the compartment N with the aid of the cold of the external liquid which flows from the receiver A round the exterior of the tubes T, and in the upper part of said compartment N with the aid of the cold of the expanded hydrogen which enters through the inlet R and passes out through the outlet E, whilst in the entire height of compartment N the condensation takes place with the aid of the cold of the compressed hydrogen which, after issuing from the top of the tubes T into the upper collector G, is sent back from the top of the system of tubes to the bottom in indirect and methodical contact with the ascending gases by passage through the interior of the tubes $t$ inserted in the tubes T. The hydrogen which is thus reheated passes into the receiver F whence it is delivered through the pipe W to the expansion device S, and after expansion therein it is returned to the column through the inlet R to cool the top of the nest of tubes as previously described. If desired and in order to complete the reheating of the hydrogen, should this be necessary, there may be inserted in the path of the hydrogen between the receiver F and the expansion device S a liquefier fed by a part of the gases to be treated upon their exit from the temperature exchangers through which the said gases to be treated are passed prior to their entering the separating column proper, the hydrogen on its way to the expansion device and the gases to be treated passing through the liquefier in indirect contact with one another. Liquefiers used in this connection are well known in the art, one being shown, for example, in Patent No. 1,579,348, granted April 6, 1926, to Georges Claude, for which reason illustration thereof in the present case is deemed unnecessary.

It is particularly important that the hydrogen (which is very poor in carbon monoxide) that is obtained by this process should not be contaminated by the liquids which may be accidentally carried along through the tubes T consequent upon an incorrect regulation of the valve V or from any other cause. To prevent this there is employed a tube K the upper end of which projects less than the other tubes T and $t$ over the tube plate X of the upper gas collector G while its lower end is immersed in the liquid in the collector D. The tube K is intended to return automatically into the receptacle D any liquid which may be carried up through the tubes T into the collector G. An arrangement of this kind can be utilized in all analogous cases with the same object in view as just mentioned. Instead of an hydraulic seal the tube K may be provided at its lower end with an outlet orifice of small diameter whereby the same result is obtained.

In the apparatus shown in Figure 2 which is designed for the treatment of water gas or similar gases, the gas to be treated upon its egress from the temperature exchangers is admitted to the bottom of the separation column through the inlet A' and ascends through the tubes T of the single tube system, progressively losing during its ascent its carbon monoxide and eventually its nitrogen; these gases flow back in the liquid state to the lower collector D whence they re-ascend through the tube U and are discharged into the receiver A from which the liquid flows down round the tubes T. The compressed hydrogen which arrives at the top of the group of tubes T then enters, as in the case of the apparatus shown in Figure 1, into the tubes $t$, which latter extend through the tubes T to the bottom of the separation column and discharge into the receiver F, from which the compressed hydrogen passes through the pipe W to the expansion device S and thence, after its expansion, through the inlet R at the top of the column and round the system of tubes as described above, finally leaving the column through the outlet E' and then passing to the temperature exchanger. The reheating of the hydrogen in this arrangement is more complete than in the apparatus shown in Figure 1 as it is effected up to the neighborhood of the temperature of admission of the gases into the separation column and its expansion with external work can be accomplished directly under better conditions than with the preceding arrangement. As in the apparatus of Figure 1 the tube K, which only projects slightly above the tube plate X of the upper collector G and has its lower end immersed in the liquid which flows into the collecting receptacle D', serves to return towards the bottom of the column any liquids which might be accidentally carried along through the tubes T.

It will be understood that the reheating of the compressed hydrogen up to the neighbourhood of the temperature of admission of the gases into the separation column may be used in the case of mixtures of gases more complex than water gas, in which case there are employed several sections of superposed tube systems with several collectors for the various liquids formed.

The hydrogen issuing from the expander may be returned directly to the top of the tube system as in the apparatus illustrated in Figure 2, or it can also be used for liquefying the auxiliary nitrogen which is then delivered in the liquid state to a special compartment of the separation column located round the top of the tube system T where it vaporizes and produces the low temperature required for effecting the final purification of the compressed hydrogen. If the nitrogen liquefied by the expanded hydrogen is produced under a sufficient pressure, it can even be delivered into a rectification column so as to subject the compressed hydrogen which issues from the top of the tubes T to a washing treatment which will result in an effective elimination of the carbon monoxide. It will be understood of course that this latter procedure will only be applicable in cases where the presence of a considerable proportion of nitrogen in the hydrogen produced is not a matter of consequence.

Figure 3 shows diagrammatically an apparatus for carrying out this last modified process in the case of coke oven gases. These gases arrive at A', ascend a first set of tubes $T^1$ where they are cooled both by the separated gas circulating downwardly through tubes $t$ and by the evaporating liquid discharged at $B^1$ and derived from the liquid collected at $D^1$ and passing through pipe $U^1$ provided with valve $V^1$. This liquid is composed mainly of methane which issues at $K^1$ as gas.

The ascending gas coming from tubes $T^1$ then ascends tubes $T^2$ where it is cooled both by the separated gas circulating downwardly through tubes $t$ and first by the evaporating liquid (chiefly carbon monoxide and nitrogen) derived from collector $D^2$ through pipe $U^2$ and valve $V^2$, then by the expanded separated gas circulating in chamber $Q^1$, and finally by the liquid nitrogen evaporating in chamber $Q^2$. The separated gas rich in hydrogen issuing through pipe $X^1$ circulates then through the rectifying column Y where it meets liquid nitrogen; the resulting gaseous mixture, very rich in hydrogen and nitrogen, escapes through pipe Z, circulates downwardly through the whole length of tubes $t$, issues at the bottom through pipe W, and expands in engine S, the expanded cold gas circulating in liquefier L where it liquefies the nitrogen which arrives in a compressed and cold state at $N^2$. The expanded gas then passes through pipe $R^1$ to chamber $Q^1$, while the liquid nitrogen from the liquefier is delivered to chamber $Q^2$ and rectification column Y through pipes O and P that branch from a vertical pipe $N^1$ connected to the bottom of said liquefier.

It may furthermore be mentioned that the gaseous mixtures which are treated for the extraction of the hydrogen therefrom usually contain more or less nitrogen; in consequence of the very low temperature to which the gases treated in accordance with the present process are subjected, this nitrogen is liquefied to a very large extent in the neighbourhood of the upper parts of the tubes T of the apparatus described and the washing effected by this liquid nitrogen reinforces the effect of the low temperature in eliminating the carbon monoxide in a very efficacious manner.

It may happen however that this elimination of nitrogen from the hydrogen at the top of the tubes T takes place to an extent to interfere with the working of the expander owing to a lack of lubrication. This disadvantage can be overcome by effecting an improvement in the cooling conditions by sending to the expander, simultaneously with the reheated compressed hydrogen, a certain quantity of compressed nitrogen which has been cooled in a temperature exchanger, for example in the cases of the treatment of coke oven gases by means preferably of the ethylene and a part of the methane which are first condensed.

This deficiency of nitrogen may also be remedied by re-heating under pressure the liquids rich in nitrogen supplied by the upper collector, this reheating being effected in such manner that the nitrogen is made to re-enter the gases which ascend in the last section of the tube system, with the result that an increased washing and hence a more complete elimination of the carbon monoxide take place, and finally a certain quantity of nitrogen is made to pass out with the hydrogen at the top of the tube system and to enter the expander.

It is to be understood that the process of the present invention is applicable to the separation by partial liquefaction of the constituents of gaseous mixtures other than hydrogen-containing mixtures.

Having now particularly described and ascertained the nature of my said invention and in what manner the same is to be performed, I declare that I claim is:—

1. A method of separating the constituents of gaseous mixtures by cold, which comprises subjecting to a partial liquefaction the gaseous mixture under pressure; expanding the non-liquefied gaseous part resulting from said partial liquefaction; circulating the gaseous mixture under pressure which is undergoing partial liquefaction in indirect contact with the compressed non-liquefied gaseous part resulting from said partial liquefaction; and circulating the said non-liquefied gaseous part, after expansion, in indirect contact with the above portion of the gaseous mixture under pressure which is circulating in indirect contact with the compressed non-liquefied gaseous part.

2. A method of separating the constituents of gaseous mixtures by cold, which comprises subjecting to a partial liquefaction the gaseous mixture under pressure; expanding the non-liquefied gaseous part resulting from said partial liquefaction; circulating the gaseous mixture under pressure which is undergoing partial liquefaction, upwardly and in countercurrent with the compressed, separated, gaseous part resulting from said partial liquefaction; and circulating the expanded gas downwardly in indirect contact with the above portion of the gaseous mixture under pressure which is circulating in countercurrent with the compressed, separated, gaseous part.

2. A method of separating the constituents of gaseous mixtures by cold, which comprises partially liquefying the gaseous mixture under pressure; and further cooling the gaseous mixture under pressure, by simultaneous indirect contact both with expanded gas and with the compressed, separated gaseous part.

4. A method of separating the constituents of gaseous mixtures by cold, which comprises partially liquefying the gaseous mixture under pressure; collecting the liquids thus formed; relieving the pressure of said liquids, circulating the gaseous mixture under pressure in indirect contact with the said liquids, and evaporating the latter to bring about the partial liquefaction of the compressed gaseous mixture; further cooling the said gaseous mixture; expanding the remaining gaseous part; and circulating the same in indirect contact with the gaseous mixture under pressure, while maintaining said mixture in indirect contact with the said remaining gaseous part before expansion.

5. A method of separating the constituents of gaseous mixtures by cold, which comprises partially liquefying the gaseous mixture under pressure; collecting the liquids thus obtained; expanding the compressed, separated, gaseous part; using said liquids and said compressed gaseous parts simultaneously in the liquefaction of said gaseous mixture; and further cooling the gaseous mixture by simultaneous indirect contact both with the compressed, separated, gaseous part and with the said gaseous part expanded.

6. A method of separating the constituents of gaseous mixtures by cold, which comprises subjecting the gaseous mixture under pressure to a partial liquefaction; collecting the liquids resulting from said partial liquefaction; and circulating the separated, compressed, gaseous part resulting from said liquefaction in indirect contact with the interior part of streams of the compressed gaseous mixture, while circulating the external part of said streams in indirect contact with the prior collected liquids, the evaporation of which brings about the partial liquefaction of the compressed gaseous mixture.

7. A method of separating the constituents of gaseous mixture by cold, which comprises subjecting the gaseous mixture under pressure to a partial liquefaction; circulating the separated, compressed, gaseous part resulting from said partial liquefaction in indirect contact with the interior part of streams of the compressed, gaseous mixture, while circulating the external part of said streams in indirect contact with evaporating liquids; expanding said separated gaseous part; and then using it for the cooling of the gaseous mixture.

8. A method of separating the constituents of gaseous mixtures by cold, which comprises subjecting the gaseous mixture under pressure to a partial liquefaction; circulating the separated, compressed, gaseous part resulting from said partial liquefaction in indirect contact with the interior part of streams of the compressed gaseous mixture, while circulating the external part of said streams in indirect contact with evaporating liquids; expanding said separated, gaseous part; cooling another gas under pressure by said expanded gaseous part; and then cooling the gaseous mixture undergoing partial liquefaction by the said expanded gaseous part and the liquefied other gas.

9. A method of separating the constituents of gaseous mixture by cold, which comprises subjecting the gaseous mixture under pressure to a partial liquefaction; circulating the separated, compressed, gaseous part resulting from said partial liquefaction in indirect contact with the interior part of streams of the compressed gaseous mixture, while circulating the external part of said streams in indirect contact with evaporating liquids; expanding said separated gaseous part; liquefying another gas under pressure by indirect contact with said expanded gaseous part; cooling the compressed gaseous mixture by the said expanded gaseous part and a part of the liquid other gas; and washing the compressed gaseous part resulting from the partial liquefaction by another part of the said liquefied other gas.

In testimony whereof I affix my signature.

ALFRED ETIENNE.